United States Patent
Ahuja et al.

(10) Patent No.: US 10,534,179 B1
(45) Date of Patent: Jan. 14, 2020

(54) IMAGE PROJECTION SYSTEMS AND METHODS

(71) Applicant: Meta View, Inc., San Mateo, CA (US)

(72) Inventors: Ashish Ahuja, Mountain view, CA (US); Jie Xiang, Mountain view, CA (US)

(73) Assignee: Meta View, Inc., San Mateo, CA (US)

( * ) Notice: Subject to any disclaimer, the term of this patent is extended or adjusted under 35 U.S.C. 154(b) by 198 days.

(21) Appl. No.: 15/782,613

(22) Filed: Oct. 12, 2017

Related U.S. Application Data

(60) Provisional application No. 62/409,505, filed on Oct. 18, 2016.

(51) Int. Cl.
| | | |
|---|---|---|
| *G02B 27/01* | (2006.01) | |
| *G02B 26/08* | (2006.01) | |
| *H04N 9/31* | (2006.01) | |
| *H04N 5/335* | (2011.01) | |
| *H04N 13/279* | (2018.01) | |
| *F21V 8/00* | (2006.01) | |

(52) U.S. Cl.
CPC ..... *G02B 27/0172* (2013.01); *G02B 26/0833* (2013.01); *H04N 5/335* (2013.01); *H04N 9/3173* (2013.01); *H04N 13/279* (2018.05); *G02B 6/0016* (2013.01); *G02B 2027/0125* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 2015/0346495 A1* | 12/2015 | Welch | G02B 27/0172 345/8 |
| 2016/0026253 A1 | 1/2016 | Bradski | |
| 2016/0077336 A1 | 3/2016 | Hainich | |
| 2016/0370855 A1 | 12/2016 | Lanier | |
| 2017/0235143 A1 | 8/2017 | Chi | |
| 2017/0329075 A1* | 11/2017 | Yeoh | G02B 6/0016 |
| 2018/0364487 A1* | 12/2018 | Yeoh | G02B 27/44 |
| 2019/0187474 A1* | 6/2019 | Bhargava | G06K 9/00671 |

FOREIGN PATENT DOCUMENTS

DE 102014013320 3/2016

OTHER PUBLICATIONS

Final Office Action, U.S. Appl. No. 14/852,573, dated Nov. 28, 2017 (10 pages).
Notice of Appeal From the Examiner to the Board of Patent Appeals and Interferences, U.S. Appl. No. 14/852,573, dated Jan. 30, 2018 (2 pages).
Draft Appeal Brief Under 37 CFR 41.31(a)(1), U.S. Appl. No. 14/852,573, dated Jan. 30, 2018 (27 pages).

\* cited by examiner

*Primary Examiner* — Jennifer D. Carruth

(57) ABSTRACT

Systems and methods of image projection are presented herein. Image projection may be facilitated by a layered waveguide and/or other components. The layered waveguide may have an input portion and a presentation portion. Light may be received from a display at the input portion and output at the presentation portion. Th input portion may include coupling optical features. The presentation portion ma include presentation optical features forming Bragg diffraction gratings. Relative proportions of light emitted by the display and coupled onto the layers may be controlled adjust a cumulative focal length of the layered waveguide.

20 Claims, 6 Drawing Sheets

IMAGE PROJECTION SYSTEMS AND METHODS

FIELD OF THE INVENTION

The system and methods described herein relate to image projection.

BACKGROUND OF THE INVENTION

There are many types of vision systems that provide virtual or augmented reality displays. In particular, wearable technology such as head mounted displays (HMD) is becoming more popular.

SUMMARY

The image projection systems and methods described herein facilitate providing views of virtual content in an interactive environment. Virtual content may include virtual objects in the form of three-dimensional digital imagery. An interactive environment may include one or more of a virtual reality environment, augmented reality environment, and/or other interactive environments. An augmented reality environment may include views of images of virtual content superimposed over views of a real-world environment. A virtual reality environment may include views of images of virtual content within a virtual environment.

One or more implementations of an image projection system may comprise one or more of a display, a layered waveguide, one or more physical processors, and/or other components. The display may be configured to emit light forming images. The layered waveguide may include one or more of an input portion, a presentation portion, and/or other components. The layered waveguide may be configured to receive the light from the display at the input portion. The layered waveguide may be configured to selectively output the light at the presentation portion. The light may be directed toward one or both eyes of a user.

The layered waveguide may include one or more sets of layers. In some implementations, the one or more sets of layers may include a first set of layers and a second set of layers.

The first set of layers may include one or more of a first layer, a second layer, a third layer, and/or other layers. Individual layers in the first set of layers may include one or more of coupling optical features, presentation optical features, and/or other components. The coupling optical features may be included in the individual layers at the input portion of the layered waveguide. The coupling optical features may be configured to selectively couple light from the display into the first set of layers. The presentation optical features may be included in the individual layers at the presentation portion of the layered waveguide. The presentation optical features may be configured with a first focal length. Light coupled into the first set of layers by the coupling optical features of the first set of layers may be output from the first set of layers by the presentation optical features with the first focal length.

The second set of layers may include one or more of a fourth layer, a fifth layer, a sixth layer, and/or other layers. Individual layers in the second set of layers may include one or more of coupling optical features, presentation optical features, and/or other components. The coupling optical features may be included in the individual layers at the input portion of the layered waveguide. The coupling optical features may be configured to selectively couple light from the display into the second set of layers. The presentation optical features may be included in the individual layers at the presentation portion of the layered waveguide. The presentation optical features may be configured with a second focal length. Light coupled into the second set of layers by the coupling optical features of the second set of layers may be output from the second set of layers by the presentation optical features with the second focal length. The second focal length may be different than the first focal length.

The one or more physical processors may be configured by machine-readable instructions. Executing the machine-readable instructions may cause the layered waveguide to project images into one or both eyes of a user. The machine-readable instructions may include one or more computer program components. The computer program components may include one or more of a display control component, an optical control component, and/or other components.

The display control component may be configured to control the display to emit light to form an image corresponding to virtual content to be perceived within a viewing users field-of-view.

The optical control component may be configured to control relative proportions of light emitted by the display that are coupled onto the first set of layers and the second set of layers to adjust a cumulative focal length of the layered waveguide. Adjusting the cumulative focal length may adjust a depth of focus of the image formed by the light.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
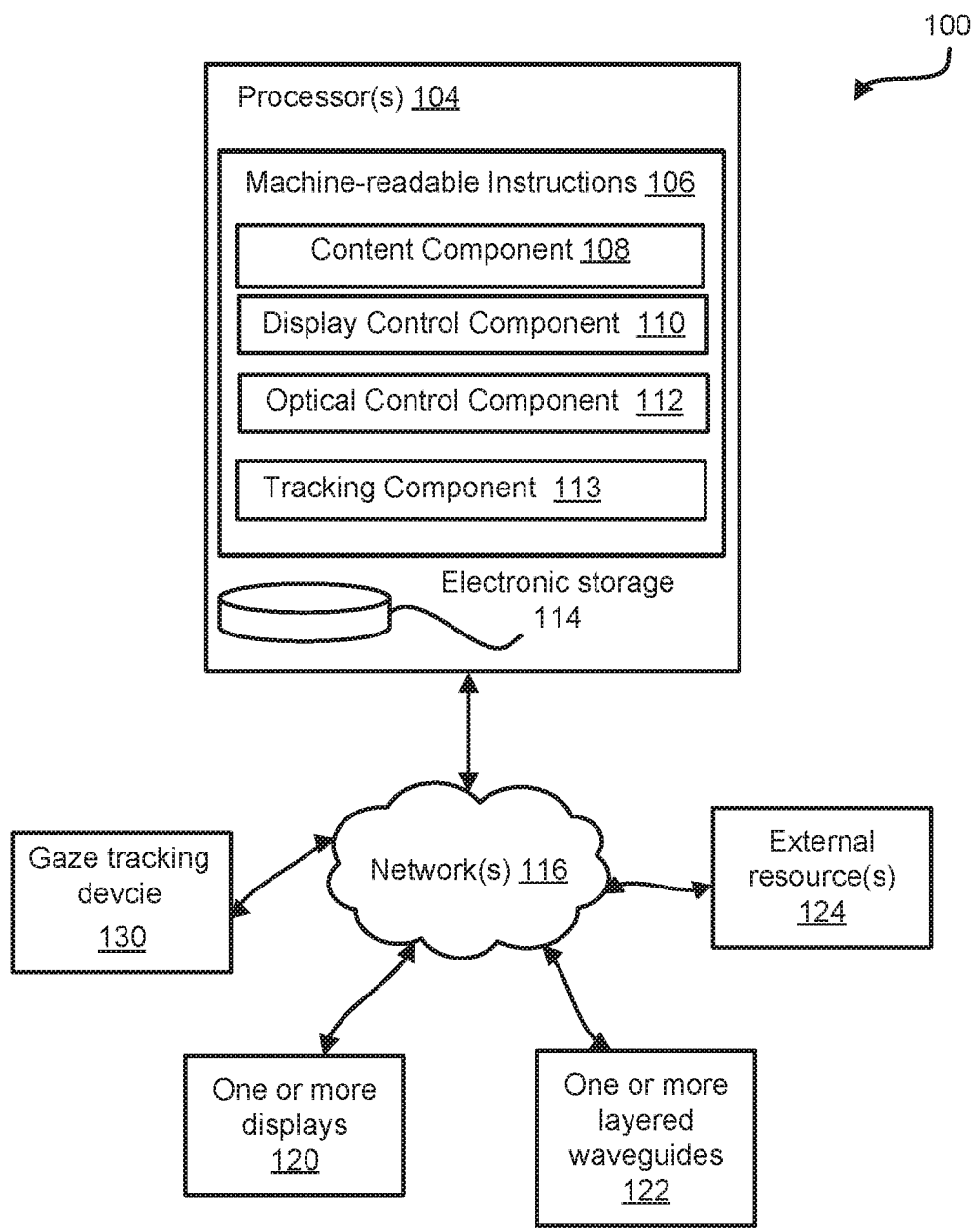
FIG. 1 illustrates an image projection system, in accordance with one or more implementations.

FIG. 1 shows an image projection system 100, in accordance with one or more implementations. The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form and/or perceive coherent virtual content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

It is noted that while one or more features and/or functions of the systems and methods described herein may be directed to augmented reality environments, this is for illustrative purposes only and is not to be considered limiting. For example, in some implementations, one or more features and/or functions of the systems and methods described herein may be similarly carried out for other interactive environments, including virtual reality environments and/or other interactive environments.

The system 100 may include one or more of one or more physical processors 104, one or more displays 120, one or more layered waveguides 122, and/or other components. In some implementations, one or more components of system 100 may be incorporated in a headset (not shown in FIG. 1), and/or other devices. The headset may include one or more of a head-mounted display (HMD), glasses, goggles, and/or other headsets. By way of non-limiting illustration, one or more layered waveguides 122 may comprise at least part of a visor of an HMD, and/or other components. One or more of one or more physical processors 104, one or more displays 120, and/or other components may be incorporated into one or more of a head band, temple portions, visor frame, and/or other portions of an HMD.

In some implementations, one or more components of system 100 may be included in one or more devices external to a headset. For example, one or more components may be included in one or more of a desktop computer, a laptop computer, other mobile computer configurations, and/or other computing devices. By way of non-limiting illustration, one or more physical processors 104 and/or other components may be included in a mobile computing device external to a headset. One or more of one or more displays 120, one or more layered waveguides 122, and/or other components may be coupled to the headset. The headset may be tethered and/or otherwise connected to the one or more external devices. Such connection may be wired (e.g., USB, HDMI, and/or other wired connection) and/or wireless (e.g., Bluetooth, Wi-Fi, and/or other wireless connection).

In some implementations, individual displays of one or more displays 120 may comprise one or more of a liquid crystal display (LCD), a light emitting diode (LED) display, surface-conduction electron-emitter display (SED), an organic light emitting diode (OLED) display, a MEMS mirror based display, liquid crystal on silicon (LCoS) display, digital light projector (DLP), a microdisplay, and/or other displays. An individual display may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create digital images.

In some implementations, individual ones of one or more displays 120 may be positioned relative to individual ones of one or more layered waveguides 122 and a user, such that light emitted from one or more displays 120 may be received by one or more layered waveguides 122 and guided to the eye(s) of the user. The user may perceive the light, which may form digital images, as virtual content within their field-of-view. Individual digital images may be formed with individual depths of focus. The individual depths of focus of the individual digital images may impact individual perceived ranges of virtual content (corresponding to the individual digital images) in a gradient three-dimensional light field within the user's field-of-view. By way of non-limiting illustration, the three-dimensional light field may comprise one or more virtual focal planes that virtual content may appear to lie on. The ranges of the individual virtual focal planes and/or the virtual content appearing to lie on the individual virtual focal planes may be impacted by the individual depths of focus of the digital images. The individual depths of focus of the digital images may be adjusted by controlling individual focal lengths of individual ones of one or more layered waveguides 122 (see, e.g., optical control component 112).

In some implementations, an individual layered waveguide of one or more layered waveguides 122 may have an individual input portion and an individual presentation portion. The individual layered waveguide may be configured to receive light from individual ones of one or more displays 120 at the input portion. The individual layered waveguide may be configured to selectively output light received from individual ones of one or more displays 120 at the presentation portion. The output of light may be guided to the eye(s) of a user. In some implementations, an individual input portion and an individual presentation portion of an individual layered waveguide may be disposed at opposing sides, or ends, of the individual layered waveguide.

In some implementations, individual input portions of individual layered waveguides may include one or more coupling optical features, and/or other components. The coupling optical features in an input portion of a layered waveguide may be configured to selectively couple light emitted from a display into the layered waveguide. In some implementations, coupling optical features may include Bragg diffraction gratings, and/or other coupling optical features.

In some implementations, individual presentation portions of individual layered waveguides may include one or more presentation optical features. The one or more presentation optical features may form Bragg diffraction gratings and/or other formations. The presentation optical features forming Bragg diffraction gratings of a presentation portion of a layered waveguide may be configured with individual focal lengths. The light coupled into the layered waveguide by coupling optical features of an input portion may be output from the layered waveguide by presentation optical features forming Bragg diffraction gratings at a presentation portion. In some implementations, individual layered waveguides may be individually controllable to adjust a proportion of light that may be coupled into the individual layered waveguides relative an amount of light emitted from a display.

In some implementations, an individual layered waveguide may include one set of layers. In some implementations, an individual layered waveguide may include multiple sets of layers. An individual layer may be formed from holographic-polymer dispensed liquid crystal, and/or other materials.

By way of non-limiting illustration, a layered waveguide may include one or more of a first set of layers, a second set of layers, and/or other sets of layers. The first set of layers may include one or more of a first layer, a second layer, a third layer, and/or other layers. Individual layers in the first set of layers may include coupling optical features in an input portion of the layered waveguide. The coupling optical features may be configured to selectively couple light from one or more displays into individual layers of the first set of layers. The selective coupling may include selective proportional coupling of light into the individual layers relative the light emitted from a display. Individual layers in the first set of layers may include presentation optical features designating a first focal length of light output from a presentation portion of the layered waveguide. For example, such presentation optical features may include Bragg diffraction gratings and/or other optical features. The layered waveguide may be configured such that light coupled into the first set of layers by coupling optical features at the input portion may be output from the first set of layers by the presentation optical features at the presentation portion having the first focal length. It is noted that while descriptions of one or more implementations may be directed to optical features forming Bragg diffraction gratings, this is for illustrative purposes only and is not to be considered limiting. For example, in some implementations, the optical features may include other optical elements and/or configurations suitable for the intended purpose. Other optical elements may include holographic optical elements (HOE) and/or other optical elements.

The second set of layers may include one or more of a fourth layer, a fifth layer, a sixth layer, and/or other layers. The individual layers in the second set of layers may include coupling optical features in the input portion of the layered waveguide. The coupling optical features may be configured to selectively couple light from one or more displays into individual layers in the second set of layers. Individual layers in the second set of layers may include presentation optical features designating a second focal length of light output at the presentation portion of the layered waveguide. For example, such presentation optical features may include Bragg diffraction gratings and/or other optical features. The layered waveguide may be configured such that light coupled into the second set of layers by the coupling optical features may be output from the second set of layers by the presentation optical features forming Bragg diffraction gratings with the second focal length. The first focal length associated with the first set of layers may be different from the second focal length associated with the second set of features.

In some implementations, individual layers in individual sets of multiple layers may comprise coupling optical features (e.g., Bragg diffraction gratings) at an input portion configured couple light into the individual layers, propagate light through the individual layers, and guide individual wavelengths of light to one or more eyes of a user via presentation optical features at a presentation portion. An individual layer may include coupling optical features at an input portion that may be configured to facilitate total internal reflection of light of one or more wavelengths. The individual layer may be configured to propagate the light of the individual wavelength to a presentation portion of the layer. The light of the individual wavelength may be communicated out of the individual layer at the presentation portion and guided toward a user's eye. Individual wavelengths of light may correspond to individual colors of light. Individual layers in a set of multiple layers of a layered waveguide may have Bragg diffraction gratings corresponding to different colors.

In some implementations, individual sets of layers may be individually controllable (see, e.g., optical control component 112) to facilitate coupling of light into individual sets of layers. In some implementations, control may include switching coupling optical features on and/or off. In some implementations, control may include adjusting a proportion of individual wavelengths of light that may be coupled into the individual layers relative to the light emitted from a display. In some implementations, control may be achieved by applying electrical bias and/or other control techniques. For example, applying a bias on an input and/or output of a coupling optical feature (e.g., a Bragg diffraction grating and/or other coupling optical feature) may switch it on and/or off. In an "on" mode of operation, light may be coupled into the waveguide via the gratings, propagated through the waveguide, and directed out of a presentation portion to the eye(s). In an "off" mode of operation, light may not be able to couple into the waveguide. The off mode, the waveguide may provide a full transmission of light through the waveguide. The real world may be viewable through the waveguide.

In some implementations, modulating a bias applied to an input and/or output of an optical feature may facilitate modulating proportions of individual wavelengths of light that may be coupled in the individual layers. In some implementations, a layered waveguide and/or individual layers in an layered waveguide may comprise components such as those manufactured by Digilens (Sunnyvale, Calif.) (e.g., switchable Bragg grating (SBG) based optics), and/or other components. In some implementations, a layered waveguide and/or individual layers may comprise one or more components such as those described in U.S. Pat. No. 6,525,847, which is incorporated herein by reference in its entirety.

Individual layers within individual sets of layers may have a thickness in the range of 200 to 600 micrometers and/or other ranges. In some implementations, individual layers may have a thickness of 400 micrometers, and/or other thicknesses. In some implementations, the optical features (e.g., Bragg diffraction grating) may be written into a photopolymer and/or other materials. The photopolymer in which optical features may be written may be approximately 10 µm thick. The optical features and/or the individual layers may be sandwiched between two glass substrates. The thickness of a glass substrate may be in the range of 100-200 µm and/or within other ranges. An overall width and/or height of the layered waveguide may depend on a size (e.g., width and/or height) of the input portion and/or a size of a presentation portion. In some implementations, a size of an input portion may be in the range of 5 mm-50 mm and/or other ranges. In some implementations, a size of a presentation portion may be in the range of 10 mm-50 mm and/or other ranges.

Figure 2:
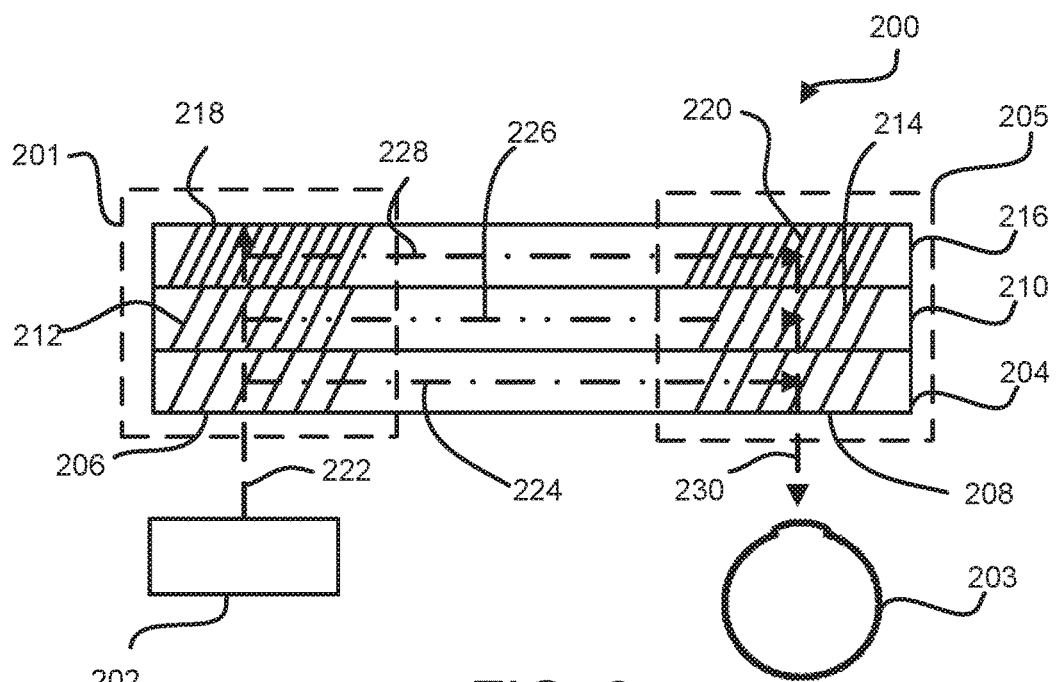
FIG. 2 illustrates an exemplary configuration of a display and a layered waveguide of an image projection system, in accordance with one or more implementations.

FIG. 2 illustrates an exemplary configuration of a display 202 and a layered waveguide 200, in accordance with one or more implementations of system 100 (FIG. 1) presented herein. The display 202 may be configured to emit light to form an image. The emitted light may include a light beam 222. The layered waveguide 200 may include one or more of an input portion 201 (shown by dashed lines), a presentation portion 205 (shown by dashed lines), and/or other components. The layered waveguide 200 may include one or more sets of layers. The one or more sets of layers may include a first set of layers and/or other sets of layers.

The first set of layers may comprise one or more of a first layer 204, a second layer 210, a third layer 216, and/or other layers. Individual layers in the first set of layers may include coupling optical features 206, 212, and 218 in input portion 201, and/or other components. For example, first layer 204 may include coupling optical features 206; second layer 210 may include coupling optical features 212; and third layer 216 may include coupling optical features 218. The coupling optical features 206, 212, and 218 may be configured to selectively couple light (including light beam 222) from display 202 into individual layers.

Individual layers in the first set of layers may include presentation optical features forming Bragg diffraction gratings 208, 214, and 220. The Bragg diffraction gratings 208, 214, and 220 may be of a first focal length. The Bragg diffraction gratings 208, 214, and 220 may be disposed at a presentation portion 205. For example, first layer 204 may include Bragg diffraction gratings 208; second layer 210 may include Bragg diffraction gratings 214; and third layer 216 may include may include Bragg diffraction gratings 220. Light coupled into the first set of layers by the coupling optical features 206, 212 and 218 may be output at presentation portion 205 by Bragg diffraction gratings 208, 214 and 220 with the first focal length.

Individual layers 204, 210, and 216 may be configured to couple individual wavelengths of light into the respective layers in proportions to the light emitted from display 202. Individual layers 204, 210, and 216 may be configured to propagate individual wavelengths of light from input portion 201 to presentation portion 205 of layered waveguide 200.

By way of non-limiting illustration, FIG. 2 illustrates light beam 222 emitted from display 202 and transmitted through coupling optical features 206, 212, and 218. The first layer 204 may be configured to couple a light beam 224 comprising a first proportion of light beam 222 of a first wavelength into first layer 204 via coupling optical features 206. The first layer 204 may include optical features forming Bragg diffraction gratings 208 used to guide light beam 224 to user's eye 203 at presentation portion 205.

The second layer 210 may be configured to couple a light beam 226 comprising the first proportion of light beam 222 of a second wavelength into second layer 210 via coupling optical features 212. The second layer 210 may include optical features forming Bragg diffraction gratings 214 used to guide light beam 226 coupled into second layer 210 to user's eye 203 via presentation portion 205.

The third layer 216 may be configured to couple a light beam 228 comprising the first proportion of light beam 222 of a third wavelength into third layer 216 via coupling optical features 218. The third layer 216 may include optical features forming Bragg diffraction gratings 220 used to guide light beam 228 coupled into third layer 216 to user's eye 203 via presentation portion 205. The individual wavelengths of light may be combined as they reach the user's eye 203 to form a cumulative light beam 230.

In some implementations, individual wavelengths of light may correspond to individual colors. By way of non-limiting illustration, the first wavelength of light may correspond to the color red, and/or other colors. The second wavelength of light may correspond to the color green, and/or other colors. The third wavelength of light may correspond to the color blue, and/or other colors.

Figure 3:
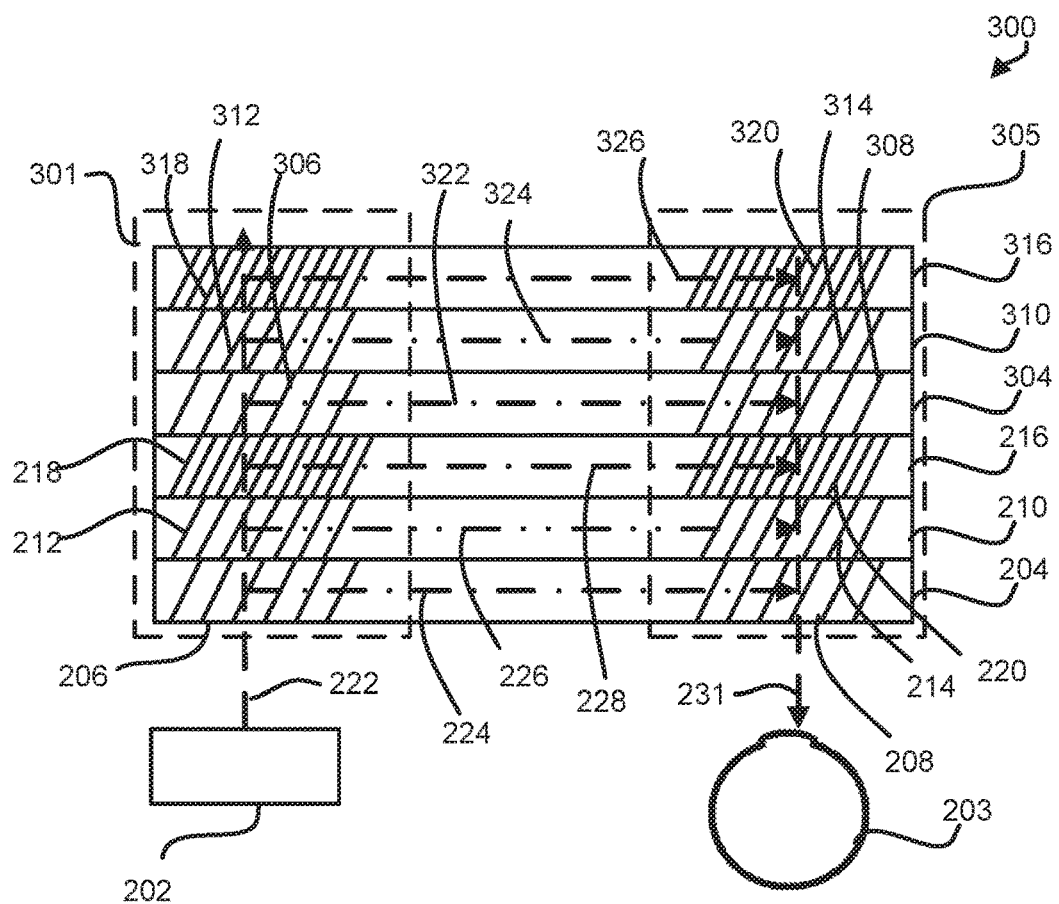
FIG. 3 illustrates another exemplary configuration of a display and a layered waveguide of an image projection system, in accordance with one or more implementations.

FIG. 3 illustrates an exemplary configuration of a display 202 and a layered waveguide 300, in accordance with one or more implementations of system 100 (FIG. 1) presented herein. The display 202 may be configured to emit light to form an image. The emitted light may include light beam 222. The layered waveguide 300 may include one or more of an input portion 301, a presentation portion 305, and/or other components. The layered waveguide 300 may include one or more sets of layers. The one or more sets of layers may include one or more of a first set of layers, a second set of layers, and/or other sets of layers. The first set of layers may comprise one or more of first layer 204, second layer 210, third layer 216, and/or other layers as presented above in connection with FIG. 2. The layers in the first set of layers in FIG. 3 may include the same or similar components as the first set of layers described in connection with FIG. 2. It is noted that the depiction and description of two sets of layers is for illustrative purposes only and is not to be considered limiting. For example, in some implementations, layered waveguide 300 may have three or more sets of layers.

The second set of layers may include one or more of a fourth layer 304, a fifth layer 310, a sixth layer 316, and/or other layers. Individual layers in the second set of layers may include coupling optical features 306, 312, and 318 in input portion 301 of the layered waveguide 300, and/or other components. For example, fourth layer 304 may include coupling optical features 306; fifth layer 310 may include coupling optical features 312; and sixth layer 316 may include coupling optical features 318. The coupling optical features 306, 312, and 318 may be configured to selectively couple proportions of light beam 222 of one or more wavelengths into the layer included in the second set of layers. Individual layers in the second set of layers may include presentation optical features forming Bragg diffraction gratings 308, 314, and 320. The Bragg diffraction gratings 308, 314, and 320 may be of a second focal length. The Bragg diffraction gratings 308, 314, and 320 may be disposed at presentation portion 205. For example, fourth layer 304 may include Bragg diffraction gratings 308; fifth layer 310 may include Bragg diffraction gratings 314; and sixth layer 316 may include Bragg diffraction gratings 320. The second focal length associated with the second set of layers may be different from the first focal length associated with the first set of layers (e.g., layers 204, 210, and 216). Light coupled into the second set of layers by the coupling optical features 306, 312, and 318 may be output from the second set of layers at presentation portion 305 by Bragg diffraction gratings 308, 314 and 320 of the second focal length.

Individual layers 304, 310, and 316 of the second set of layers may be configured to couple individual wavelengths of light into the respective layers in proportion to the light that reaches the second set of layers after passing through the first set of layers. Individual layers 304, 310, and 316 may be configured to guide individual wavelengths of light from input portion 301 to presentation portion 305.

By way of non-limiting illustration, FIG. 3 illustrates light beam 222 emitted from display 202 and transmitted through coupling optical features 206, 212, and 218, wherein first proportions of individual wavelengths of light may be coupled into individual ones of layers 204, 210, and/or 216. With the remaining light passing to the second set of layers, fourth layer 304 may be configured to couple a light beam 322 comprising a second proportion of light beam 222 of the first wavelength into fourth layer 304 via coupling optical features 306. The fourth layer 304 may include presentation optical features forming Bragg diffraction gratings 308 used to guide light beam 322 coupled into fourth layer 304 to user's eye 203 via presentation portion 305. The fifth layer 310 may be configured to couple a light beam 324 comprising the second proportion of light beam 222 of the second wavelength into fifth layer 310 via coupling optical features 312. The fifth layer 310 may include optical features forming Bragg diffraction gratings 314 used to guide light beam 324 coupled into fifth layer 310 to user's eye 203 via presentation portion 305. The sixth layer 316 may be configured to couple a light beam 326 comprising the second proportion of light beam 222 of the third wavelength into sixth layer 316 via coupling optical features 318. The sixth layer 316 may include optical features forming Bragg diffraction gratings 320 used to guide light beam 326 to user's eye 203 via presentation portion 305. The individual wavelengths of light (from both the first set of layers and the second set of layers) may be combined as they reach the user's eye 203 to form a cumulative light beam 231.

In some implementations, by controlling (e.g., via an optical control component such as optical control component 112 in FIG. 1) relative proportions of light emitted by display 202 that are coupled into input portion 301 of layered waveguide 300 and directed into the respective layers of the first set of layers and the second set of layers, a cumulative focal length of layered waveguide 300 may be adjusted. Such adjustability may result in images from such light to be formed with adjustable depth of focus. By adjusting the depth of focus, the virtual content formed by the images may be perceived at adjustable ranges within a three-dimensional light field. In some implementations, adjustable depth of focus may also be achieved by adjusting brightness of light emitted by a display.

Figure 8:
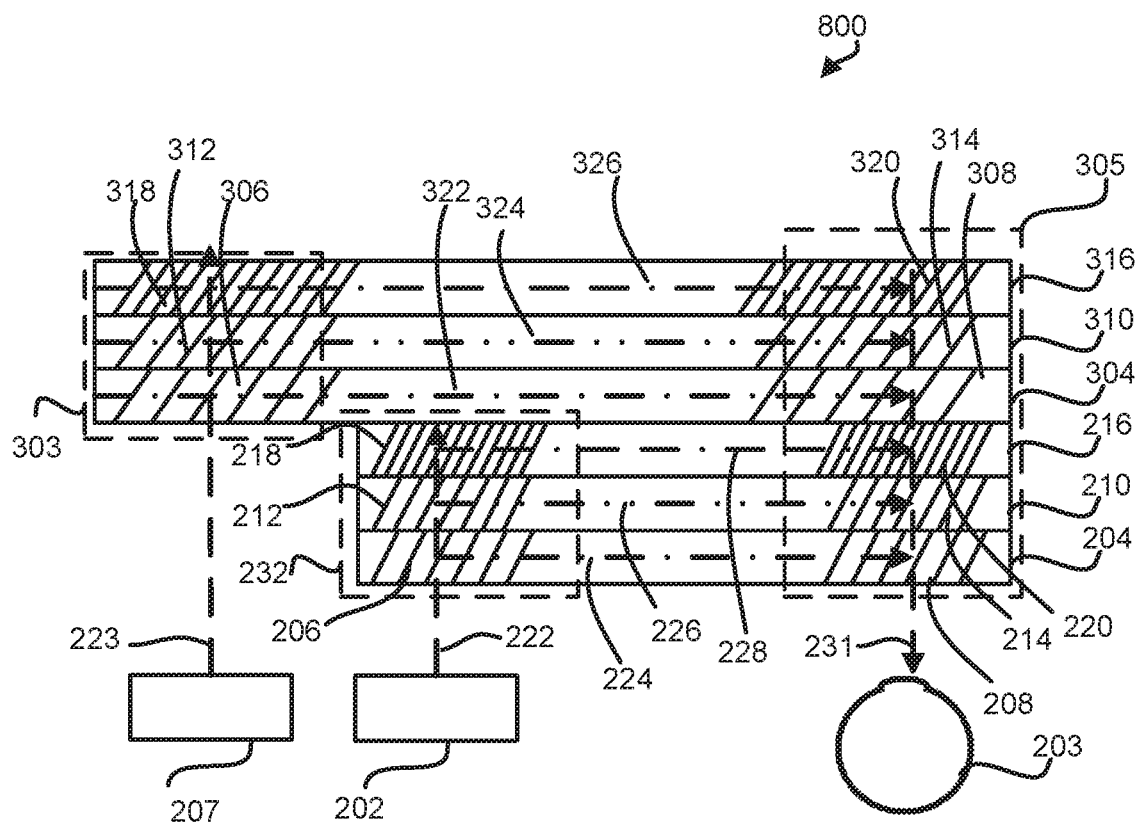
FIG. 8 illustrates an exemplary configuration of a set of displays and a layered waveguide of an image projection system, in accordance with one or more implementations.

FIG. 8 illustrates an exemplary configuration of a set of displays (e.g., display 202 and a second display 207) and a layered waveguide 800 of an image projection system, in accordance with one or more implementations. The display 202 and second display 207 may be configured to individually emit light to form one or more images. The light emitted from display 202 may include light beam 222. The light emitted from second display 207 may include light beam 223. The layered waveguide 800 may include one or more of a first input portion 232, a second input portion 303, a presentation portion 305, and/or other components. The layered waveguide 300 may include one or more sets of layers. The one or more sets of layers may include one or more of a first set of layers, a second set of layers, and/or other sets of layers. The first set of layers may comprise one or more of first layer 204, second layer 210, third layer 216, and/or other layers. The first input portion 232 may be associated with the first set of layers. The display 202 may emit light into the first input portion 232. The layers in the first set of layers of layered waveguide 800 may include the same or similar components as the first set of layers described in connection with layered waveguide 200 in FIG. 2 and/or layered waveguide 300 in FIG. 3.

The second set of layers may include one or more of fourth layer 304, fifth layer 310, sixth layer 316, and/or other layers. The second input portion 303 may be associated with the second set of layers. The second display 207 may emit light into second input portion 303. The layers in the second set of layers may include the same or similar components as the second set of layers described in connection with layered waveguide 200 in FIG. 2 and/or layered waveguide 300 FIG. 3. In FIG. 8, the second set of layers in layered waveguide 800 may be longer than the first set of layers such that second input portion 303 may not be aligned with first input portion 232. For example, the first set of layers and second set of layers may have a tiled or staggered configuration. The second display 207 may be configured to emit light into second input portion 303 independently from light emitted into first input portion 232 by display 202. For example, light beams 322, 324, and 326 may include light of different wavelengths derived from light beam 223. The light beams 224, 226, and 228 may include light of different wavelengths derived from light beam 222. It is noted that the depiction and description of two sets of layers is for illustrative purposes only and is not to be considered limiting. For example, in some implementations, layered waveguide 800 may have three or more sets of layers.

In the configuration of layered waveguide 800 in FIG. 8, controlling display 202 and second display 207 may allow for content to be presented at one or more focal planes and/or focal volumes that may be between individual focal planes associated with the individual sets of layers. By way of non-limiting illustration, display 202 may be configured to present a portion of a scene whose depth may correspond to the focal plane associated with the first set of layers. The second display 207 may be configured to present a portion of the scene whose depth may correspond to a focal plane associated with the second set of layers. By modulating the content presented by display 202 and second display 207, a depth of focus of cumulative light 231 that reaches user's eye 203 may be adjusted. This depth of focus may be dependent on the specific rendering of individual displays as well as fixed focal planes of the sets of layers.

Figure 9:
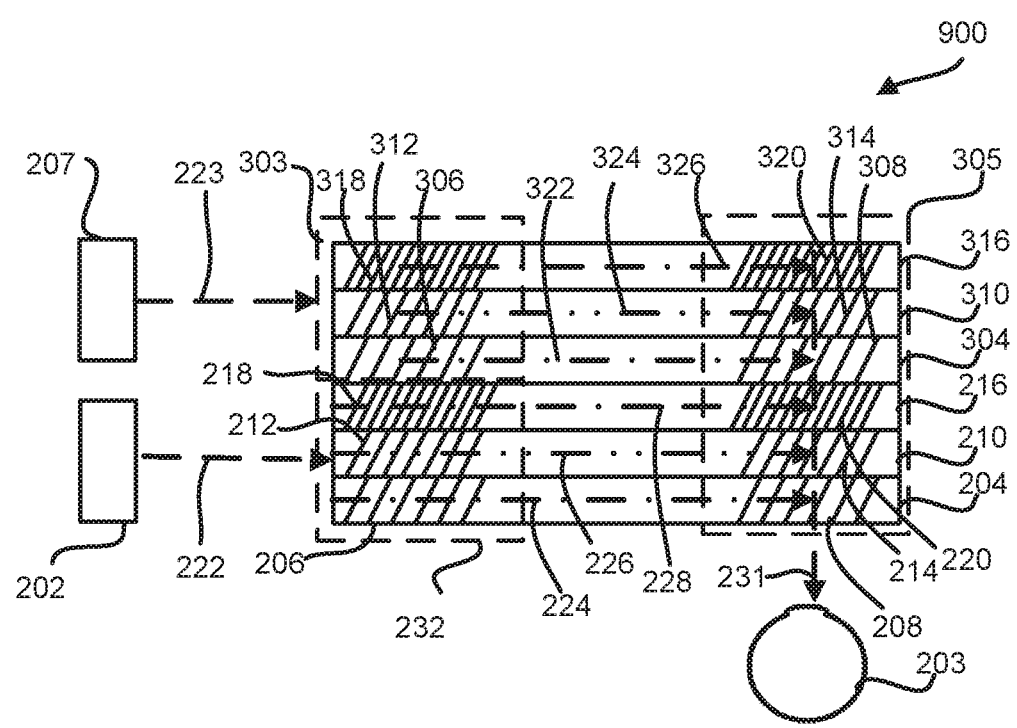
FIG. 9 illustrates another exemplary configuration of a set of displays and a layered waveguide of an image projection system, in accordance with one or more implementations.

FIG. 9 illustrates another exemplary configuration of a set of displays (e.g., display 202 and second display 207) and a layered waveguide 900 of an image projection system, in accordance with one or more implementations. The display 202 and second display 207 may be configured to individually emit light to form one or more images. The emitted light may include a light beam 222 and a light beam 223, respectively. The layered waveguide 900 may include one or more of a first input portion 232, a second input portion 303, a presentation portion 305, and/or other components. The layered waveguide 300 may include one or more sets of layers. The one or more sets of layers may include one or more of a first set of layers, a second set of layers, and/or other sets of layers. The first set of layers may comprise one or more of first layer 204, second layer 210, third layer 216, and/or other layers. The first input portion 232 may be associated with the first set of layers. The display 202 may emit light into the first input portion 232. The light emitted by display 202 may be directed into a side edge of the first set of layers (e.g., perpendicular to the arrangement shown in FIG. 3). The layers in the first set of layers of layered waveguide 900 may include the same or similar components as the first set of layers described in connection with layered waveguide 200 in FIG. 2 and/or layered waveguide 300 in FIG. 3.

The second set of layers may include one or more of fourth layer 304, fifth layer 310, sixth layer 316, and/or other layers. The second input portion 303 may be associated with the second set of layers. The second display 207 may emit light into second input portion 303. The light emitted by second display 207 may be directed into a side edge of the second set of layers. The layers in the second set of layers in layered waveguide 900 may include the same or similar components as the second set of layers described in connection with layered waveguide 300 in FIG. 3. The second display 207 may be configured to emit light into second input portion 303 independently from light emitted into first input portion 232 by display 202. For example, light beams 322, 324, and 326 may include light of different wavelengths that may be derived from light beam 223. The light beams 224, 226, and 228 may include light of different wavelengths derived from light beam 222. It is noted that the depiction and description of two sets of layers is for illustrative purposes only and is not to be considered limiting. For example, in some implementations, layered waveguide 900 may have three or more sets of layers. The control of the configuration shown in FIG. 9 may be accomplished in the same or similar manner as described above in connection with FIG. 8.

Returning to FIG. 1, one or more physical processors 104 may be configured by machine-readable instructions 106. Executing machine-readable instructions 106 may cause one or more physical processors 104 to facilitate providing views of virtual content in an augmented reality environment. The machine-readable instructions 106 may include one or more of a content component 108, a display control component 110, an optical control component 112, a tracking component 113, and/or other components.

In some implementations, content component 108 may be configured to determine virtual content to present to a user. Virtual content may include one or more virtual objects, virtual worlds, and/or other virtual content. In some implementations, information defining virtual content may be stored in non-transitory electronic storage 114 and/or other storage locations. Information defining virtual content may define one or more attributes of the virtual content. By way of non-limiting illustration, information defining virtual content may define one or more of a shape, a size, a form, a color, an orientation, and/or other information defining virtual content.

In some implementations, display control component 110 may be configured to control individual ones of one or more displays 120. The display control component 110 may be configured to control individual ones of one or more displays 120 to emit light to form one or more digital images. The display control component 110 may be configured to control individual ones of one or more displays 120 to emit light to form one or more digital images corresponding to virtual content to be perceived within a viewing users field-of-view.

The optical control component 112 may be configured to control individual ones of one or more layered waveguides 122. Control of individual ones of one or more layered waveguides 122 may include control of individual sets of layers included in individual ones of the one or more layered waveguides 122. In some implementations, controlling individual sets of layers included in a layered waveguide may include controlling proportions of light coupled onto individual layers.

In some implementations, controlling the relative proportions of light directed into individual ones of the sets of layers included in the layered waveguide may adjust a cumulative focal length of the layered waveguide. Adjusting the cumulative focal length of the layered waveguide may adjust the depth of focus of images formed from such light. In some implementations, controlling the brightness of light directed into individual ones of the sets of layers included in the layered waveguide may further facilitate adjusting depth of focus. Adjusting the depth of focus of the light forming digital images may impact perceived ranges of virtual content (corresponding to the formed digital images) within a three-dimensional light field in a user's field-of-view.

By way of non-limiting illustration, optical control component 112 may be configured to control individual sets of layers in individual layered waveguides by adjusting relative proportions of light coupled into the individual sets of layers to generate a perceived gradient three-dimensional light field. In a layered waveguide having multiple sets of layers, an individual set of layers may have an individual focal length that corresponds to an individual potential virtual focal plane in a three-dimensional light field. By way of non-limiting illustration, a first set of layers having a first focal length may cause light output from a presentation portion to have a first depth of focus dictated by the first focal length. The first depth of focus may correspond to a first virtual focal plane disposed at a first range within the three-dimensional light field. In some implementations, when the first focal length is configured such that the first depth of focus causes the digital image to focus closer to the user, the first virtual focal plane may appear closer to the user. When the first focal length is configured such that the first depth of focus causes the digital image to focus farther from the user, the first virtual focal plane may appear farther from the user.

In some implementations, in a layered waveguide having multiple sets of layers, an individual set of layers may have an individual focal length that corresponds to an individual potential virtual focal plane defining a leading boundary of a volume of a three-dimensional light field. Another individual set of layers may have an individual focal length that corresponds to an individual potential virtual focal plane defining a trailing boundary of the volume. Yet another individual set of layers may have an individual focal length that corresponds to an individual potential virtual focal plane defining an intermediate focal plane within the boundary of the volume. When a cumulative focal length of a layered waveguide is incrementally adjusted, one or more intermediate virtual focal planes may be defined at incremental ranges between the leading boundary and the trailing boundary.

Figure 4:
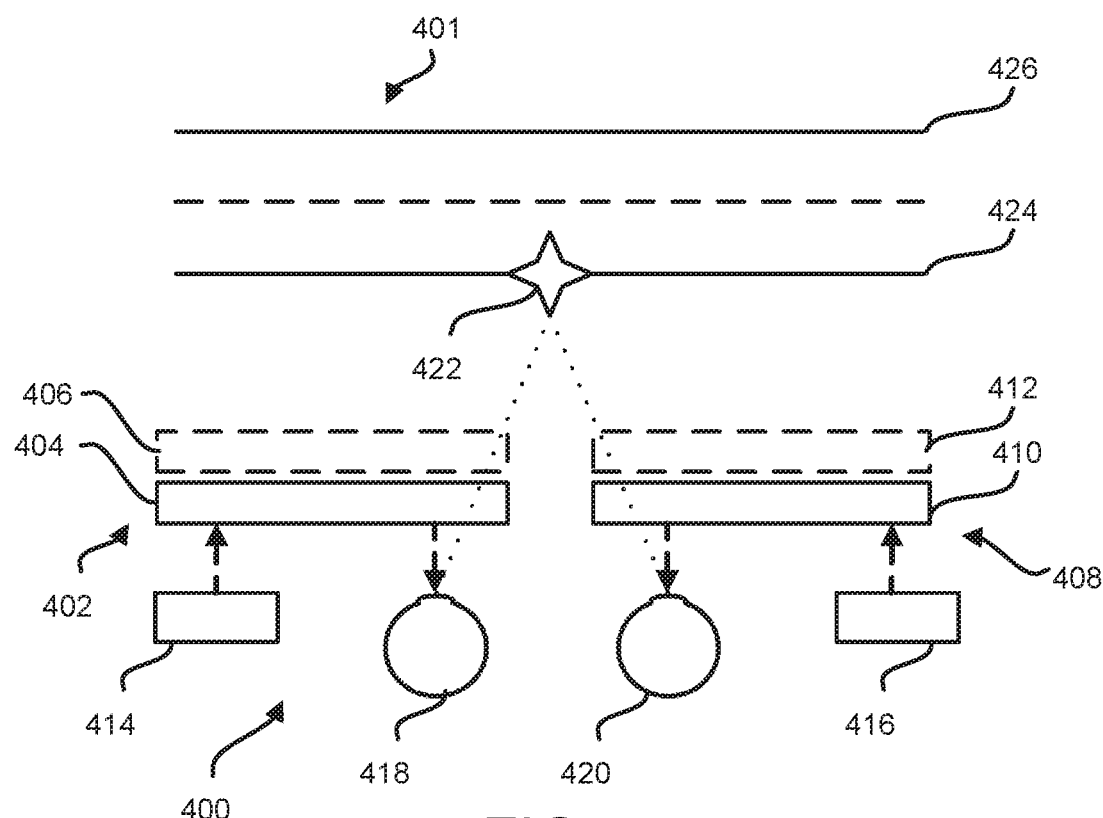
FIG. 4 illustrates an exemplary configuration of an image projection system, in accordance with one or more implementations.

FIG. 4 shows an exemplary image projection system 400, in accordance with one or more implementations. The system 400 may comprise one or more of a first layered waveguide 402, a second layered waveguide 408, a first display 414, a second display 416, one or more physical processors (not shown), and/or other components. The first layered waveguide 402 may include one or more of a first set of layers 404, a second set of layers 406, and/or other sets of layers (not shown). The second layered waveguide 408 may include one or more of a third set of layers 410, a fourth set of layers 412, and/or other sets of layers (not shown). In some implementations, first layered waveguide 402 may comprise an arrangement that may be same or similar to the configuration of layered waveguide 300 in FIG. 3, and/or other configurations. In some implementations, second layered waveguide 408 may be a mirrored configuration of first layered waveguide 402, and/or other configurations. In some implementations, one or more components of system 400 may be incorporated into a headset, and/or other devices.

The following description is directed to the first layered waveguide 402 and first display 414, however this is not to be considered limiting. For example, it is noted that second layered waveguide 408 and second display 416 may be controlled in the same or similar manner as first layered waveguide 402 and first display 414, respectively, such that digital images may be presented in stereo, and combined by the viewing user to generated coherent, cohesive virtual content 422 within their field-of-view. For example, digital images may be presented to the users eyes 418 and 420 in stereo and combined by the brain to form coherent, cohesive virtual content 422 within their field-of-view.

In system 400, first display 414 may be controlled (e.g., via a display control component the same or similar to display control component 110 in FIG. 1) to emit light to form digital images. Individual ones of the first set of layers 404 and second set of layers 406 may be controlled (e.g., via an optical control component the same or similar to optical control component 112 in FIG. 2) by adjusting relative proportion of light coupled into the individual ones of first set of layers 404 and second set of layers 406 to generate a perceived three-dimensional light field 401. The bounds of a volume of three-dimensional light field 401 may be determined based on individual focal lengths of individual ones of first set of layers 404 and second set of layers 406. By way of non-limiting illustration, first set of layers 404 (and third set of layers 410) may have a first focal length corresponding to a first focal plane 424 defining a leading boundary of the volume of three-dimensional light field 401. The second set of layers 406 (and fourth set of layers 412) may have a second focal length corresponding to a second focal plane 426 defining a trailing boundary of the volume of three-dimensional light field 401.

By way of non-limiting illustration in FIG. 4, when light may be coupled into first set of layers 404 (and third set of layers 410) and not into second set of layers 406 (and fourth set of layers 412), as indicated by the dashed lines for second set of layers 406 (and fourth set of layers 412), virtual content 422 may be perceived to lie at or near first focal plane 424.

Figure 5:
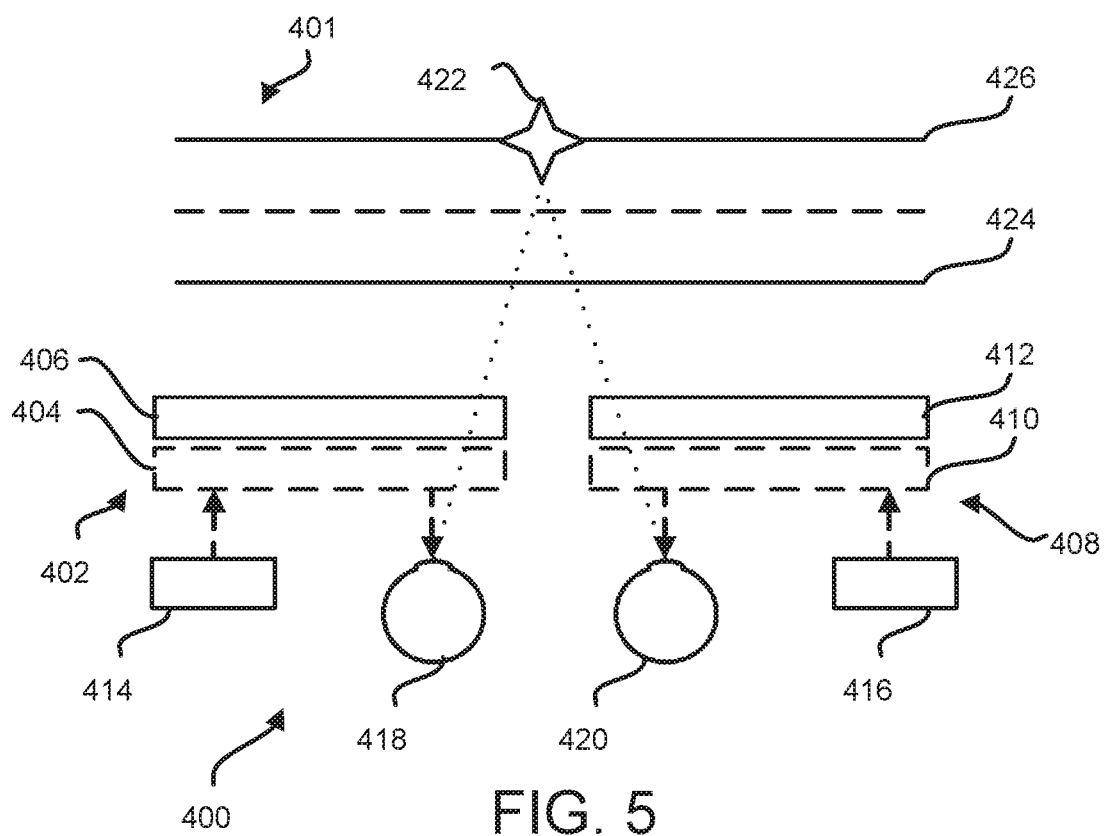
FIG. 5 illustrates an exemplary configuration of an image projection system, in accordance with one or more implementations.

By way of non-limiting illustration in FIG. 5, when light may be coupled into second set of layers 406 (and fourth set of layers 412) and not first set of layers 404 (and third set of layers 410), as indicated by the dashed lines for first set of layers 404 (and third set of layers 410), virtual content 422 may be perceived to lie at or near second focal plane 426.

In some implementations, by balancing relative proportions of light coupled into first set of layers 404 (and third set of layers 410) and second set of layers 406 (and fourth set of layers 412), a cumulative focal length of first layered waveguide 402—and in some implementations, concurrently, a cumulative focal length of second layered waveguide 408—may be adjusted. Accordingly, one or more potential virtual focal planes may be generated at ranges between first focal plane 424 and second focal plane 426 based on the adjusted cumulative focal length(s). A cumulative focal length longer than the first focal length may position virtual content closer to second focal plane 426, while a cumulative focal length shorter than the second focal length may position virtual content closer to first focal plane 424.

Figure 6:
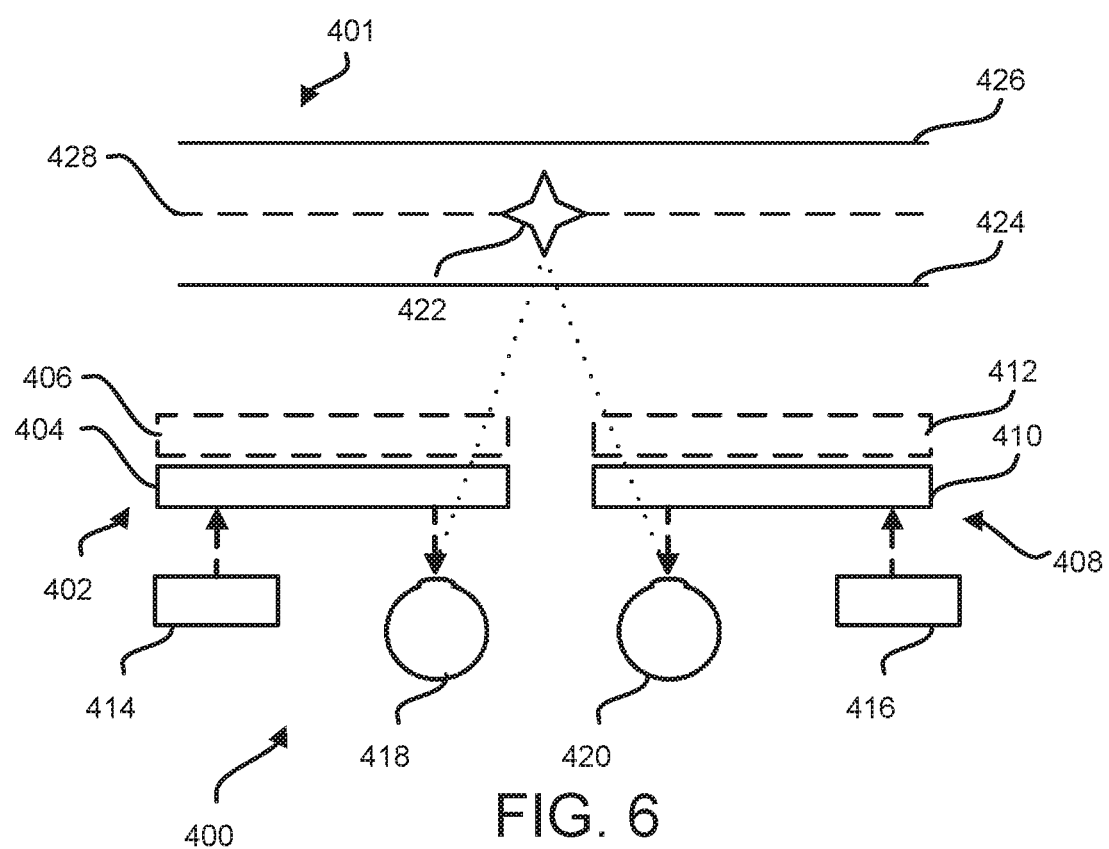
FIG. 6 illustrates an exemplary configuration of an image projection system, in accordance with one or more implementations.

By way of non-limiting illustration in FIG. 6, adjustments to a proportion of light coupled into first set of layers 404 relative to that coupled into second set of layers 406—and concurrently, the proportion of light coupled into third set of layers 410 relative to that coupled into fourth set of layers 412—may cause virtual content 422 to be perceived at or near an intermediate focal plane 428 lying between first focal plane 424 and second focal plane 426. It is noted that while only first set of layers 404 and second set of layers 406 are shown, one or more additional sets of layers may be provided for first layered waveguide 402, and for second layered waveguide 408, respectively. For example, one or more additional sets of layers may be positioned between first set of layers 404 and second set of layers 406, and may individually correspond to individual focal planes that may lie between first focal plane 424 and second focal plane 426.

Returning to FIG. 1, gaze tracking device 130 may include one or more of one or more sensors, an emitter, and/or other components. The emitter may be configured to emit light. The emitter may comprise an infrared (IR) emitter configured to emit IR light. In some implementations, a sensor may comprise one or more of an IR sensor, an image sensor, and/or other sensors. A sensor may be incorporated into a camera and/or other devices. By way of non-limiting illustration, a sensor of gaze tracking device 130 may comprise an IR camera and/or other devices. In some implementations, output signals of one or more sensors of gaze tracking device 130 may convey one or more of positions of one or more pupils of a user relative to a locus of a reflectance of light emitted by an emitter of gaze tracking device 130, and/or other information. Output signals of one or more sensors of gaze tracking device 130 may be used to determine gaze information, distance information, and/or other information.

In some implementations, tracking component 113 of machine-readable instructions 106 may be configured to determine one or more of gaze information, distance information, and/or other information. In some implementation, gaze information may be determined from output signals from one or more sensors of gaze tracking device 130, and/or other information. Gaze information may include one or more of gaze direction of a user over time, gaze position (e.g., a convergence point in space) of a user over time, and/or other information. In some implementations, gaze information may be determined with respect to a user's pupil and/or other reference point. By way of non-limiting illustration, gaze information may be determined from output signals of one or more sensors of gaze tracking device 130. The output signals may convey one or more of positions of one or more pupils of a user relative to a locus of a reflectance of light emitted by an emitter of gaze tracking device 130, and/or other information used to determine gaze information. In some implementations, gaze direction may be expressed as a vector within a three-dimensional coordinate system.

Distance information may comprise distance of one or more real-world objects along a user's gaze direction over time. In some implementations, distance of one or more real-world objects along a user's gaze direction over time may be determined from a determined gaze position, and/or other information. By way of non-limiting illustration, based on output signals of one or more sensors of gaze tracking device 130, a gaze position, e.g., a three-dimensional convergence point in space, may be triangulated. The distance of the convergence point from the user and/or other reference point may be included in the distance information.

In some implementations, tracking component 113 may be configured to determine ranges of one or more target focal planes. A target focal plane may comprise a two-dimensional plane in space at which virtual content may be desired to be perceived. A range of a target focal plane may be determined based on one or more of gaze information, distance information, and/or other information. A range of a target focal plane may correspond to a distance of one or more real-world objects along a user's gaze direction over time and/or other locations. For example, the user may have their eyes focused at a distance corresponding to one or more real-world objects along their gaze direction. By providing virtual content at that distance, the user may not need to readjust their focus to view the virtual content.

In some implementations, display control component 110 and/or optical control component 112 may be configured to control individual ones of one or more displays 120 and/or one or more layered waveguides 122 such that virtual content may be perceived at ranges of one or more target focal planes. By way of non-limiting illustration, tracking component 113 may be configured to determine distance information conveying a first distance of a first real-world object along a gaze direction for a first period of time. The display control component 110 and/or optical control component 112 may be configured to control individual ones of one or more displays 120 and/or one or more layered waveguides 122 such that a perceived range of virtual content on a focal plane corresponds to the first distance during the first period of time.

In some implementations, individual ones of one or more displays 120 and/or one or more layered waveguides 122 may be controlled depending on a user's focus within a target focal plane. For example, if virtual content is to be presented at different portions of a target virtual focal plane, one or both of one or more displays 120 and/or one or more layered waveguides 122 may be controlled to bring virtual content on which the user may be focusing on into focus. In some implementations, tracking component 113 may determine a fixation point of the user on a target focal plane and control one or both of one or more displays 120 and/or one or more layered waveguides 122 to focus virtual content at that fixation point of the target focal plane. In this example, tracking component 113 may determine what virtual object a user may be looking at on a target focal plane based on feedback from gaze tracking device 130. For example, gaze tracking device 130 may be configured to determine a position of a user's eyes; and tracking component 113 may be configured to determine a convergence point in a three-dimensional space, adjust a focal plane based on the determined convergence point, and/or render depth dependent disparity and/or blur for a displayed image based on the adjusted focal plane.

In FIG. 1, one or more physical processors 104, one or more displays 120, one or more layered waveguides 122, gaze tracking device 130, external resource(s) 124, and/or other components may be operatively linked via one or more electronic communication links. For example, such electronic communication links may be established, at least in part, via network(s) 116. The network(s) 116 may comprise one or both of wired or wireless communications. It will be appreciated that this is not intended to be limiting and that the scope of this disclosure includes implementations in which one or more physical processors 104, one or more displays 120, one or more layered waveguides 122, gaze tracking device 130, external resource(s) 124, and/or other components may be operatively linked via some other communication media.

The external resource(s) 124 may include sources of information, hosts, external entities participating with system 100, providers of virtual content, and/or other resources. In some implementations, some or all of the functionality attributed herein to external resource(s) 124 may be provided by resources included in system 100.

The one or more physical processors 104 may include and/or have access to electronic storage 114, and/or other components. The one or more physical processors 104 may include communication lines or ports to enable the exchange of information with a network and/or other components of system 100. Illustration of one or more physical processors 104 in FIG. 1 is not intended to be limiting. The one or more physical processors 104 may include a plurality of hardware, software, and/or firmware components operating together to provide the functionality attributed herein to one or more physical processors 104. For example, one or more physical processors 104 may be implemented by a cloud of computing platforms operating together as one or more physical processors 104.

The electronic storage 114 may comprise electronic storage media that electronically stores information. The electronic storage media of electronic storage 114 may include one or both of system storage that is provided integrally (i.e., substantially non-removable) with one or more physical processors 104 and/or removable storage that is removably connectable to one or more physical processors 104 via, for example, a port or a drive. A port may include a USB port, a firewire port, and/or other port. A drive may include a disk drive and/or other drive. The electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). The electronic storage 114 may store software algorithms, information determined by one or more physical processors 104, information received from other components of system 100, and/or other information that enables one or more physical processors 104 to function as described herein.

The one or more physical processors 104 is/are configured to provide information-processing capabilities. As such, in some implementations, one or more physical processors 104 may include one or more of a digital processor, an analog processor, a digital circuit designed to process information, an analog circuit designed to process information, a state machine, and/or other mechanisms for electronically processing information. Although one or more physical processors 104 is shown in FIG. 1 as a single entity, this is for illustrative purposes only. In some implementations, one or more physical processors 104 may include one or more processing units. These processing units may be physically located within the same device, or one or more physical processors 104 may represent processing functionality of a plurality of devices operating in coordination. The one or more physical processors 104 may be configured to execute components 108, 110, 112, and/or 113. The one or more physical processors 104 may be configured to execute components 108, 110, 112, and/or 113 by software; hardware; firmware; some combination of software, hardware, and/or firmware; and/or other mechanisms for configuring processing capabilities on one or more physical processors 104.

It should be appreciated that although components 108, 110, 112, and/or 113 are illustrated in FIG. 1 as being co-located within a single processing unit, in implementations in which one or more physical processors 104 includes multiple processing units, one or more of components 108, 110, 112, and/or 113 may be located remotely from the other components. The description of the functionality provided by the different components 108, 110, 112, and/or 113 described above is for illustrative purposes and is not intended to be limiting, as any of components 108, 110, 112, and/or 113 may provide more or less functionality than is described. For example, one or more of components 108, 110, 112, and/or 113 may be eliminated, and some or all of its functionality may be provided by other ones of components 108, 110, 112, 113, and/or other components. As another example, one or more physical processors 104 may be configured to execute one or more additional components that may perform some or all of the functionality attributed to one of components 108, 110, 112, and/or 113.

Figure 7:
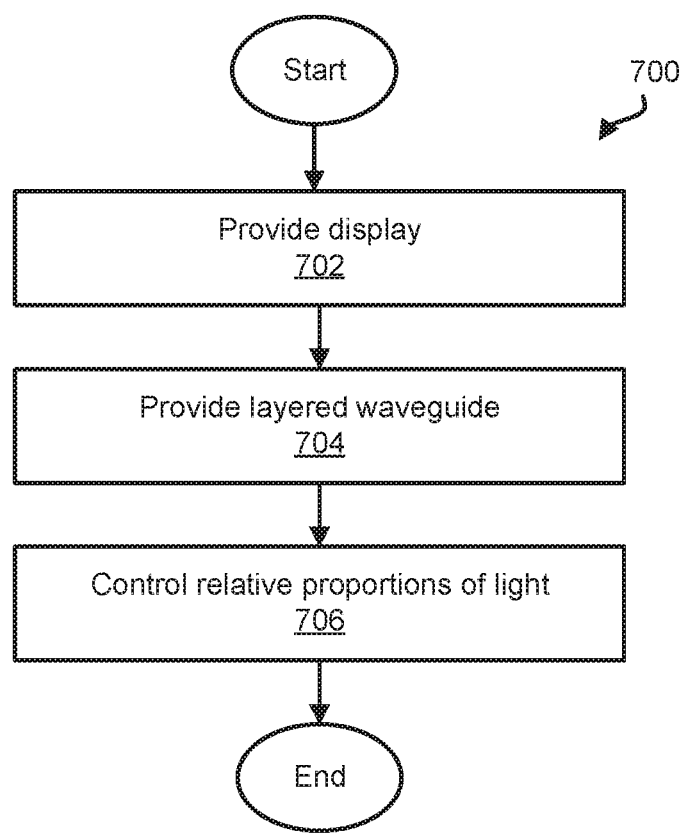
FIG. 7 illustrates a method to project images, in accordance with one or more implementations.

FIG. 7 illustrates a method 700 of projecting images, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented using one or more of a computer system, one or more displays, one or more layered waveguides, and/or other components. The computer system may comprise of one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), and/or other components. The one or more processing devices may include one or more devices executing some or all of the operations of method 700 in response to instructions stored electronically on electronic storage medium. The one or more processing devices may include one or more devices configured through hardware, firmware, and/or software to be specifically designed for execution of one or more of the operations of method 700.

At an operation 702, one or more displays may be provided. By way of non-limiting illustration, a first display may be provided. The first display may be configured to emit light to form one or more digital images. In some implementations, operation 702 may be performed using one or more displays the same as or similar to one or more displays 120 (shown in FIG. 1 and described herein).

At an operation 704, one or more layered waveguides may be provided. A layered waveguide may have one or more of an input portion, a presentation portion, and/or other portions. The layered waveguide may be configured to receive light from the first display at the input portion and to selectively output light received from the first display at the presentation portion. The layered waveguide may include multiple sets of layers. The multiple sets of layers may include one or more of a first set of layers, a second set of layers, and/or other sets of layers. The first set of layers may include one or more of a first layer, a second layer, a third layer, and/or other layers. The individual layers in the first set of layers may include coupling optical features in the input portion of the layered waveguide to selectively couple light from the first display into the first set of layers, optical features of a first focal length—for example, Bragg diffraction gratings—at the presentation portion such that light coupled into the first set of layers by the coupling optical features of the first set of layers may be output from the first set of layers by the optical features with the first focal length, and/or other components. The second set of layers may include one or more of a fourth layer, a fifth layer, a sixth layer and/or other layers. The individual layers in the second set of layers may include one or more of coupling optical features in the input portion of the layered waveguide to selectively couple light from the first display into the second set of layers, presentation optical features of a second focal length at the presentation portion such that light coupled into the second set of layers by the coupling optical features of the second set of layers may be output from the second set of layers by the Bragg diffraction gratings with the second focal length, and/or other components. The first focal length may be different than the second focal length. In some implementations, operation 704 may be performed using one or more layered waveguides the same as or similar to one or more layered waveguides 122 (shown in FIG. 1 and described herein).

At an operation 706, relative proportions of light coupled into individual sets of layers of an individual layered waveguide may be controlled. By way of non-limiting illustration, relative proportions of light emitted by the first display, coupled onto the input portion of the layered waveguide, and directed into the first set of layers, the second set of layers, and/or other sets of layers may be controlled. The control may adjust a cumulative focal length of the individual layered waveguides such that images from such light may be formed with adjustable depth of focus. In some implementations, operation 706 may be performed by one or more physical processors executing an optical control component the same as or similar to optical control component 112 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. An image projection system comprising:
a first display configured to emit light to form an image;
a layered waveguide having an input portion and a presentation portion, the layered waveguide being configured to receive the light from the first display at the input portion and to selectively output the light received from the first display at the presentation portion, the layered waveguide including multiple sets of layers, the multiple sets of layers including:
a first set of layers, the first set of layers including a first layer, a second layer, and a third layer, the individual layers in the first set of layers including:
coupling optical features in the input portion of the layered waveguide to selectively couple light from the first display into the first set of layers, and
presentation optical features of a first focal length at the presentation portion such that light coupled into the first set of layers by the coupling optical features of the first set of layers are output from the first set of layers by the presentation optical features with the first focal length; and
a second set of layers, the second set of layers including a fourth layer, a fifth layer, and a sixth layer, the individual layers in the second set of layers including:
coupling optical features in the input portion of the layered waveguide to selectively couple light from the first display into the second set of layers, and
presentation optical features of a second focal length at the presentation portion such that light coupled into the second set of layers by the coupling optical features of the second set of layers are output from the second set of layers by the presentation optical features with the second focal length, wherein the first focal length is different than the second focal length; and one or more physical processors configured by machine-readable instructions to:

control relative proportions of light emitted by the first display that are coupled onto the first set of layers and the second set of layers to adjust a cumulative focal length of the layered waveguide, wherein adjusting the cumulative focal length adjusts a depth of focus of the image formed by the light.

2. The system of claim 1, wherein the one or more physical processors are further configured by machine-readable instructions to control the first set of layers and the second set of layers such that a first proportion of the light emitted by the first display is coupled into the first set of layers and a second proportion of light emitted by the first display is coupled into the second set of layers.

3. The system of claim 2, wherein the one or more physical processors are further configured by machine-readable instructions to control the first set of layers and the second set of layers such that:

the first layer and the fourth layer are configured to couple light of a first wavelength into the first layer and the fourth layer, respectively;

the second layer and the fifth layer are configured to couple light of a second wavelength into the second layer and the fifth layer, respectively; and the third layer and sixth layer are configured to couple light of a third wavelength into the third layer and the sixth layer, respectively.

4. The system of claim 3, wherein:

the first layer and the fourth layer include presentation optical features forming Bragg diffraction gratings configured to guide the light of the first wavelength coupled into the first layer and the fourth layer, respectively, to output via the presentation portion;

the second layer and the fifth layer include presentation optical features forming Bragg diffraction gratings configured to guide the light of the second wavelength coupled into the second layer and the fifth layer, respectively, to output via the presentation portion;

the third layer and the sixth layer include presentation optical features forming Bragg diffraction gratings configured to guide the light of the third wavelength coupled into the third layer and the sixth layer, respectively, to output via the presentation portion; and the light of the first wavelength, the light of the second wavelength, and the light of the third wavelength are combined at the presentation portion to form cumulative light creating the image.

5. The system of claim 3, wherein individual wavelengths correspond to individual colors.

6. The system of claim 1, wherein the first focal length of the first set of layers corresponds to a first virtual focal plane perceived within a viewing user's field-of-view, and the second focal length of the second set of layers corresponds to a second virtual focal plane perceived within the viewing user's field-of-view.

7. The system of claim 6, wherein the first virtual focal plane and the second virtual focal plane define bounds of a volume of a gradient three-dimensional light field.

8. The system of claim 1, wherein the depth of focus impacts perceived range of the image within a user's field-of-view, such that the depth of focus being closer to the user causes the perceived range of the image to be closer to the user, and the depth of focus being farther from the user causes the perceived range of the image to be farther from the user.

9. The system of claim 1, wherein the one or more physical processors are further configured by machine-readable instructions such that controlling relative proportions of light coupled onto the first set of layers and the second set of layers comprises controlling an amount of electrical bias applied to individual ones of the first set of layers and the second set of layers.

10. The system of claim 1, wherein one or more of the first display, the layered waveguide, or the one or more physical processor are incorporated into a headset.

11. An method of projecting images, the method comprising:

providing a first display configured to emit light to form an image;

providing a layered waveguide, the layered waveguide having an input portion and a presentation portion, the layered waveguide being configured to receive light from the first display at the input portion and to selectively output light received from the first display at the presentation portion, the layered waveguide including multiple sets of layers, the multiple sets of layers including:

a first set of layers, the first set of layers including a first layer, a second layer, and a third layer, the individual layers in the first set of layers including:

coupling optical features in the input portion of the layered waveguide to selectively couple light from the first display into the first set of layers, and presentation optical features of a first focal length at the presentation portion such that light coupled into the first set of layers by the coupling optical features of the first set of layers are output from the first set of layers by the presentation optical features with the first focal length; and a second set of layers, the second set of layers including a fourth layer, a fifth layer, and a sixth layer, the individual layers in the second set of layers including:

coupling optical features in the input portion of the layered waveguide to selectively couple light from the first display into the second set of layers, and presentation optical features of a second focal length at the presentation portion such that light coupled into the second set of layers by the coupling optical features of the second set of layers are output from the second set of layers by the presentation optical features with the second focal length, wherein the first focal length is different than the second focal length; and controlling, by one or more physical processors, relative proportions of light emitted by the first display that are coupled onto the first set of layers and the second set of layers to adjust a cumulative focal length of the layered waveguide, wherein adjusting the cumulative focal length adjusts a depth of focus of the image formed by the light.

12. The method of claim 11, further comprising controlling the first set of layers and the second set of layers such that a first proportion of the light emitted by the first display is coupled into the first set of layers and a second proportion of light emitted by the first display is coupled into the second set of layers.

13. The method of claim 12, further comprising controlling the first set of layers and the second set of layers such that:

the first layer and the fourth layer couple light of a first wavelength into the first layer and the fourth layer, respectively;

the second layer and the fifth layer couple light of a second wavelength into the second layer and the fifth layer, respectively; and the third layer and sixth layer couple light of a third wavelength into the third layer and the sixth layer, respectively.

14. The method of claim 13, wherein:

the first layer and the fourth layer include presentation optical features forming Bragg diffraction gratings configured to guide the light of the first wavelength coupled into the first layer and the fourth layer, respectively, to output via the presentation portion;

the second layer and the fifth layer include presentation optical features forming Bragg diffraction gratings configured to guide the light of the second wavelength coupled into the second layer and the fifth layer, respectively, to output via the presentation portion;

the third layer and the sixth layer include presentation optical features forming Bragg diffraction gratings configured to guide the light of the third wavelength coupled into the third layer and the sixth layer, respectively, to output via the presentation portion; and the light of the first wavelength, the light of the second wavelength, and the light of the third wavelength are combined at the presentation portion to form cumulative light to create the image.

15. The method of claim 13, wherein individual wavelengths correspond to individual colors.

16. The method of claim 11, wherein the first focal length of the first set of layers corresponds to a first virtual focal plane perceived within a viewing user's field-of-view, and the second focal length of the second set of layers corresponds to a second virtual focal plane perceived within the viewing user's field-of-view.

17. The method of claim 16, wherein the first virtual focal plane and the second virtual focal plane define bounds of a volume of a gradient three-dimensional light field.

18. The method of claim 11, wherein the depth of focus impacts perceived range of the image within a user's field-of-view, such that the depth of focus being closer to the user causes the perceived range of the image to be closer to the user, and the depth of focus being farther from the user causes the perceived range of the image to be farther from the user.

19. The method of claim 11, wherein controlling relative proportions of light coupled onto the first set of layers and the second set of layers comprises:

controlling an amount of electrical bias applied to individual ones of the first set of layers and the second set of layers.

20. The method of claim 11, further comprising:

coupling one or more of the first display, the layered waveguide, or the one or more physical processor into a headset.

* * * * *